United States Patent [19]

Weiner et al.

[11] Patent Number: 5,108,044
[45] Date of Patent: Apr. 28, 1992

[54] SHROUD-FIN INTEGRATION SHELF FOR A HELICOPTER EMPENNAGE STRUCTURE

[75] Inventors: Steven D. Weiner, Orange; Robert C. Moffitt, Seymour, both of Conn.

[73] Assignee: United Technologies Corporation, Hartford, Conn.

[21] Appl. No.: 683,642

[22] Filed: Apr. 11, 1991

[51] Int. Cl.$^5$ ............................................. B64C 27/82
[52] U.S. Cl. ................................. 244/17.190; 244/130
[58] Field of Search ............... 244/17.11, 17.19, 17.21, 244/130, 87

[56] References Cited

U.S. PATENT DOCUMENTS 3,506,219  4/1970  Mouille et al. ................... 244/17.21

OTHER PUBLICATIONS

Grumm et al., "Advanced Autitorque Concepts Study" USAAMRDL Tech. Rep. 71-23, Jul. 1971, pp. 35 and 99.
Gunston, Bill et al., *Modern Fighting Helicopters*, (1986 Salamander Books Ltd.).

*Primary Examiner*—Galen Barefoot
*Attorney, Agent, or Firm*—Terrance J. Radke

[57] ABSTRACT

A shroud-fin integration shelf for a helicopter empennage structure that includes a shroud embodying a ducted fan antitorque device, a vertical stabilizer contiguous with the shroud, and a horizontal stabilizer intersecting the vertical stabilizer. The shroud-fin integration shelf is structurally configured and dimensioned to eliminate adverse aerodynamic effects experienced by the vertical stabilizer in reverse thrust operating conditions wherein mass airflow exiting the ducted fan antitorque device may flow along the shroud and interfere with longitudinal mass airflow over the suction surface of the vertical stabilizer. The integration shelf, which provides an acute transition between the shroud and the vertical stabilizer, has an overall predetermined width that includes a first shelf width on the ducted fan antitorque device inlet side of the empennage structure and a second shelf width on the opposite side of the empennage structure. The first shelf width is greater than the second shelf width to ensure attached mass airflow over the shroud is sharply separated at the shroud - shroud-fin integration shelf. The first and second shelf widths have dimensional magnitudes in the range of about four percent to about sixteen percent of the diameter of the fan assembly of the ducted fan antitorque device. Preferably, the shroud edge defining the structural boundary between the shroud and the shroud-fin integration shelf is sharp, i.e., approximately ninety degrees. The empennage structure also includes an aft shroud closure having a generally "V" shaped configuration to fix the separation points of mass airflow over the aft portions of the shroud.

7 Claims, 5 Drawing Sheets

SHROUD-FIN INTEGRATION SHELF FOR A HELICOPTER EMPENNAGE STRUCTURE

TECHNICAL FIELD

The present invention is directed to helicopters, and more particularly, to the aerodynamic configuration of a shroud-fin integration shelf and an aft shroud closure of an integrated empennage structure for helicopters embodying a ducted fan antitorque device.

1. Related Applications

The subject matter of the present invention is related to co-pending patent applications entitled INTEGRATED HELICOPTER EMPENNAGE STRUCTURE U.S. Ser. No. 07/683,903 and HELICOPTER ANTITORQUE DEVICE U.S. Ser. No. 07/683,904.

2. Background of the Invention

The majority of modern day helicopters embody a single main rotor assembly and an exposed tail rotor assembly (noted exceptions being the Aerospatiale helicopters employing a fenestron tail structure and the McDonnell Douglas helicopters employing the NOTAR TM system). The exposed tail rotor assembly has proven to be a relatively efficient and reliable means for providing lateral thrust to counteract the fuselage induced torque generated by the main rotor assembly and to provide yaw directional control of the helicopter in hover, transitional, low, and high speed flight regimes.

Exposed tail rotor assemblies, however, present disadvantages from both an aerodynamic and non-aerodynamic point of view. First and foremost, exposed tail rotor assemblies present significant safety hazards during ground operations, i.e., system run-up, hovering, taxing, and/or parking operations. The exposed tail rotor assembly poses a severe danger to adjacent personnel during ground operations. Personnel have been killed or injured by inadvertent contact with the rotating tail rotor blades of an exposed tail rotor assembly. The operating exposed tail rotor assembly also poses a hazard to other equipment located in areas of helicopter ground operations. In addition, exposed tail rotor assemblies are vulnerable to damage from objects circulated by the slip stream of the main rotor assembly.

The exposed tail rotor assembly also presents problems during helicopter flight operations such as take-offs, landings, and or maneuvering in confined areas where care must be taken to prevent inadvertent strikes of the exposed tail rotor assembly with terrain features such as power lines, buildings, fences, trees, and bushes. Numerous military applications and some civilian applications require nap of the earth (NOE) flying, sometimes at night or in reduced visibility weather. Flying in such conditions requires extra care to prevent inadvertent strikes of the exposed tail rotor assembly with such terrain features.

In addition, the aerodynamic efficiency of exposed tail rotor assemblies is degraded by various factors arising out of the very nature of such assemblies. An exposed tail rotor assembly is not generally utilized to provide the total required yaw stability in higher speed flight regimes due to drag effects and induced stresses acting on the tail rotor blades. Instead, an aerodynamically-configured vertical stabilizer is incorporated in the configuration of the helicopter empennage to provide a portion of the required yaw stability in higher speed flight regimes. The exposed tail rotor assembly, however, still provides an observable contribution to the total aerodynamic drag in such flight regimes.

To provide the antitorque thrust (lateral lift) required for hover operations and yaw maneuvers during transitional, low, and high speed flight regimes, the typical exposed tail rotor assembly has large diameter tail rotor blades (to reduce the engine power required by the tail rotor assembly to develop such thrust). The tail rotor assembly must be mounted on the vertical stabilizer to provide the necessary ground clearance for the tail rotor blades. Such an arrangement, however, results in aerodynamic interference between the vertical stabilizer and the exposed tail rotor assembly (stabilizer blockage) that reduces the aerodynamic efficiency of the exposed tail rotor assembly. This arrangement may also interfere with the aerodynamic functioning of the vertical tail structure in higher speed flight regimes. In addition, such an arrangement creates an induced roll moment about the longitudinal axis of the helicopter.

Furthermore, an exposed tail rotor assembly is generally a mechanically complex and fragile apparatus that is subjected to severe operating stresses and dynamic phenomena such as relative wind, main rotor assembly and fuselage slip streams and vortices that reduce the operating efficiency thereof. Exposure to such operating conditions tends to limit the overall useful lifetime of an exposed tail rotor assembly such that the costs associated with more frequent maintenance/overhaul are increased. In addition, exposed tail rotor assemblies are subjected to increased blade loading effects during flights at increased sideslip angles, which tends to restrict the effective operating envelope with respect to sideslips for helicopters having exposed tail rotor assemblies.

A helicopter embodying a fenestron or ducted fan antitorque device in the empennage structure provides several aerodynamic and non-aerodynamic advantages over the conventional helicopter configuration. An operating ducted fan antitorque device does not present a significant hazard to adjacent personnel or equipment. Furthermore, the empennage structure effectively shields the ducted fan from damage induced by external objects.

Aerodynamically, a ducted fan antitorque device may be effectively off-loaded in higher speed flight regimes, thereby providing a reduction in total aerodynamic drag in these flight regimes. The vertical stabilizer does not aerodynamically interfere with the operation of a ducted fan antitorque device. The tail rotor assembly of the ducted fan antitorque device is not exposed to external dynamic phenomena such that the overall lifetime of the ducted fan tail rotor assembly is improved, with the concomitant decrease in maintenance requirements. A ducted fan antitorque device effectually reduces stresses experienced by tail rotor blades during sideslipped flight, thereby expanding the operating envelope of helicopters embodying ducted fan antitorque devices. For equivalent rotor defined apertures, the aerodynamic efficiency of the ducted fan antitorque device is greater than that of an exposed tail rotor assembly such that the ducted fan antitorque device may be downsized for incorporation in the empennage structure while still providing substantially equivalent aerodynamic performance.

Aerospatiale has produced several lines of helicopters such as the Dauphin and Gazelle that include an empennage structure embodying a ducted fan antitorque device and a vertical stabilizer in combination to provide antitorque thrust and yaw directional control for a helicopter. The ducted fan antitorque devices of these helicopters have a duct axis that is substantially perpendicular to the vertical plane of symmetry of the helicopter, i.e., the tail rotor blade plane is parallel to the vertical plane. The transverse thrust developed by these antitorque devices is sufficient to provide the necessary antitorque force and yaw directional control in the hover, translational, low, and high forward speed flight regimes. The empennage structure of these helicopters includes a vertical stabilizer that is aerodynamically configured to provide lateral thrust for antitorque and yaw stability at higher forward speeds.

U.S. Pat. No. 4,809,931, issued to Aerospatiale, discloses that such prior art empennage structures do not provide any pitch stability, particularly at higher forward speeds. The '931 patent teaches that a horizontal stabilizing surface is required to provide an empennage structure that provides both static and dynamic yaw and pitch stability as well as the counterbalancing antitorque thrust. The '931 patent further teaches that this type of empennage structure is disadvantageous in that it results in a substantial increase in overall structural weight of the helicopter.

Another prior art empennage structure embodying a ducted fan antitorque device is described in the '931 patent, this prior art empennage structure replacing the vertical and horizontal stabilizers with two aerodynamic surfaces. The '931 patent teaches that the two aerodynamic surfaces extend above a horizontal plane passing through the top of the housing of the ducted fan antitorque device, and that the mean planes of the aerodynamic surfaces are disposed symmetrically with respect to each other about the vertical plane passing through the housing to define a "V" empennage. These aerodynamic surfaces are described as being configured to provide antisymmetrical aerodynamic lift profiles. The '931 patent teaches that such an empennage configuration has not achieved the advantageous results expected.

The subject matter described and claimed in the '931 patent is a helicopter empennage structure embodying a ducted fan antitorque device that simultaneously provides the antitorque force and static and dynamic stability about the yaw and pitch axes. The '931 patent teaches that the mean plane of the ducted fan antitorque housing is slanted with respect to the vertical plane of symmetry of the helicopter in an angular range of 0° to 45°. Two aerodynamic surfaces are joined in combination at the top of the housing to form a "V" empennage extending above the horizontal plane passing through the top of the housing. The '931 patent teaches that the two aerodynamic surfaces are disposed in several different embodiments wherein the respective mean planes of the aerodynamic surfaces extend disymmetrically with respect to the vertical plane of symmetry of the helicopter. The mean plane of the two aerodynamic surfaces are described as forming predetermined angles, selected from a defined range of angles, with respect to the horizontal and vertical, respectively.

SUMMARY OF THE INVENTION

One object of the present invention is to provide a shroud-fin integration shelf for a helicopter empennage structure that includes a shroud embodying a ducted fan antitorque device and a vertical stabilizer contiguous with the shroud for negating adverse aerodynamic effects on the vertical stabilizer during nose-right sideslip flight regimes.

Another object of the present invention is to provide a shroud-fin integration shelf having an asymmetrical configuration that provides an acute transitional structure between the shroud and the vertical stabilizer to separate airflow mass over the shroud from the empennage structure to prevent interference with the aerodynamic operation of the vertical stabilizer.

A further object of the present invention is to provide a shroud-fin integration shelf having a planar configuration and an overall shelf width equal to the duct width of the ducted fan antitorque device.

Yet another object of the present invention is to provide a shroud-fin integration shelf having asymmetrical first and second shelf widths based upon the fan diameter of the ducted fan antitorque device.

Still another object of the present invention is to provide an aft shroud closure for the shroud having a configuration that reduces base drag of the empennage structure and fixes the separation points of the mass airflow over the aft portions of the shroud.

These and other objects of the present invention are achieved by providing a shroud-fan integration shelf and an aft shroud closure as integral elements of a helicopter empennage structure that includes a shroud embodying a ducted fan antitorque device, a vertical stabilizer, and a horizontal stabilizer. The shroud-fin integration shelf according to the present invention is structurally configured to alleviate negative aerodynamic effects on the vertical stabilizer occurring during nose-right sideslip flight conditions which cause a marked differentiation in helicopter handling characteristics between nose-left and nose-right sideslip flight regimes.

In nose-right sideslip conditions for helicopters with counterclockwise main rotor rotation, the helicopter is so orientated that the outlet of the ducted fan antitorque device is subjected to the relative wind mass airflow, which causes the ducted fan antitorque device to operate in a reverse thrust condition. The mass airflow in the reverse thrust condition causes the ducted fan antitorque device to produce negative thrust, i.e., thrust opposite in direction to the thrust produced by the ducted fan antitorque device during normal operations.

Due to the configuration of the inlet of the ducted fan antitorque device, which has a curved lip of constant radius to facilitate mass airflow influx into the ducted fan antitorque device during normal operation, mass airflow exiting via the inlet in the reverse thrust operating condition does not readily separate from the curved lip inlet. This attached airflow moves upwardly along the shroud and over the suction surface of the vertical stabilizer. Such mass airflow causes aerodynamic interference with the longitudinal mass airflow over the vertical stabilizer produced by the forward motion of the helicopter. This aerodynamic interference reduces the lifting force produced by the vertical stabilizer. The reduction in the lifting force produced by the vertical stabilizer, in combination with the negative thrust being produced by the ducted fan antitorque device in the reverse thrust operating condition, results in a reduction in the amount of thrust the ducted fan antitorque device has to provide in nose-right sideslip flight conditions such that there are significant changes in the lateral forces produced by the vertical stabilizer and the ducted fin antitorque device in nose-right as compared to nose-left sideslip flight conditions.

The shroud-fin integration shelf according to the present invention is structurally configured and dimensioned to eliminate the adverse aerodynamic effects experienced by the vertical stabilizer in reverse thrust operating conditions. The shroud-fin integration shelf has a configuration that provides an acute transition (step change in cross section) between the shroud and the vertical stabilizer of the empennage structure. The acute transition configuration of the shroud-fin integration shelf functions to cleanly separate the attached mass airflow moving over the shroud from the empennage structure so that such mass airflow does not interfere with the aerodynamic operation of the vertical stabilizer.

The shroud-fin integration shelf according to the present invention is a planar member having a predetermined overall shelf width. The predetermined shelf width corresponds to the width of the shroud, which is equivalent to the duct depth of the ducted fan antitorque device.

The predetermined overall shelf member of the shroud-fan integration shelf may be further defined as including a first shelf member and a second shelf member. The first shelf member defines the distance between the edge of the shroud on the inlet side of the ducted fan antitorque device and the suction surface of the vertical stabilizer. The second shelf member defines the distance between the edge of the shroud on the outlet side of the ducted fan antitorque device and the corresponding surface of the vertical stabilizer. The first shelf member has a width greater than the width of the second shelf member to ensure sharp separation of the attached mass airflow over the shroud in reverse thrust operating conditions.

The widths of the first and second shelf members are determined by the mass airflow separation requirement and the thickness of the vertical stabilizer. The thickness of the vertical stabilizer is based upon structural and aerodynamic efficiency considerations. Current design practice utilizes vertical stabilizers having thicknesses in the range of 10-30% of the chord of the vertical stabilizer. The relative widths of the first and second shelf members may vary longitudinally, fore to aft, where the vertical stabilizer has a predetermined angle of incidence.

The asymmetrical first and second shelf members may have widths in the range of about 4% to about 16% of the diameter of the fan assembly of the ducted fan antitorque device. The selection of values for the first and second shelf widths is based upon the size of the vertical stabilizer, the angle of incidence of the vertical stabilizer, the airfoil section of the vertical stabilizer, thrust developed by the ducted fan antitorque device, and helicopter design speed.

The configuration of the shelf edge demarking the boundary between the shroud and the shroud-fin integration shelf is preferably sharp, i.e., approximately a 90° angle. A shelf edge having a sharp angular configuration facilitates mass airflow separation at the structural interface between the shroud and the shroud-fin integration shelf. The shelf edge may be rounded to reduce the overall shelf width, which concomitantly reduces the parasite drag effects of the empennage structure.

The shroud-fin integration shelf may be utilized in an empennage structure wherein the vertical stabilizer is uncanted with respect to the shroud. The aforedescribed shroud-fin integration shelf has particular utility with an integrated empennage structure wherein the vertical stabilizer is spatially orientated at a predetermined cant angle with respect to the shroud.

Closure of the shroud behind the ducted fan antitorque device poses several problems. For minimum base drag in high speed forward flight, a faired trailing edge appears to be optimal. Such a configuration, however, increases the overall weight of the empennage structure and presents a large surface area during lateral flight regimes which necessitates increased power for lateral flight. An empennage structure having a configuration that presents minimum area in side flight regimes, however, would have higher drag in the forward flight regimes. The aft shroud closure may have a sharp trailing edge configuration. The yaw stability of helicopters embodying such a configuration is not very good, the tail structure wagging laterally in forward flight regimes. A wide, blunt trailing edge configuration has been utilized as the aft shroud closure, but such a configuration engenders a large base drag penalty.

The aft shroud closure according to the present invention is a planar configuration of approximately "V" shape. Such a configuration has a reduced base drag. The configuration of the aft shroud closure commences at the trailing edge of the vertical stabilizer and is angled vertically with respect to the shroud-fin integration shelf. The configuration of the aft shroud closure functions to fix the separation points of the mass airflow over the aft portions of the shroud to enhance the yaw stability characteristics of the helicopter.

BRIEF DESCRIPTION OF THE DRAWINGS

A more complete understanding of the present invention and the attendant advantages and features thereof will be more readily attained by reference to the following detailed description when considered in conjunction with the accompanying drawings wherein.

DETAILED DESCRIPTION OF PREFERRED EMBODIMENTS

Figure 1:
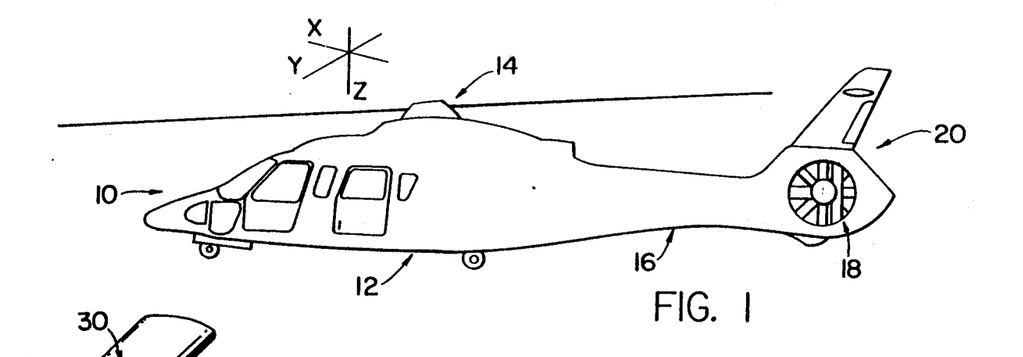
FIG. 1 is a side plan view of a helicopter embodying a ducted fan antitorque device in an integrated empennage structure incorporating a shroud-fin integration shelf and aft shroud closure according to the present invention.

Referring now to the drawings wherein like reference alphanumerics designate corresponding or similar elements throughout the several views, a helicopter 10 embodying a ducted fan antitorque device is illustrated in FIG. 1. The helicopter 10 includes a fuselage 12, a main rotor assembly 14, a tail boom 16, and an empennage structure 20 that includes a ducted fan antitorque device 18. Also illustrated in FIG. 1 is the reference system associated with the helicopter 10, an X—X axis defining the longitudinal axis, a Y—Y axis defining the lateral axis, and a Z—Z axis defining the vertical axis A vertical plane Zs, defining the medial plane of symmetry of the helicopter fuselage 12, is shown in embodiment of FIG. 4A. In the following disclosure, references to the vertical plane Zs should be understood as also encompassing planes parallel to the vertical plane Zs.

The main rotor assembly 14 includes the power system (not shown—typically one to three turbine engines) that provides the profile, induced, parasite and climb power for turning the main rotor blades, lifting the helicopter 10, propelling the helicopter 10 in forward flight, and maneuvering the helicopter 10 in ascents and descents, respectively. The main rotor assembly 14 also includes the transmission system (not shown) that transmits engine power to the main rotor blades and the ducted fan antitorque device 18.

Figure 2:
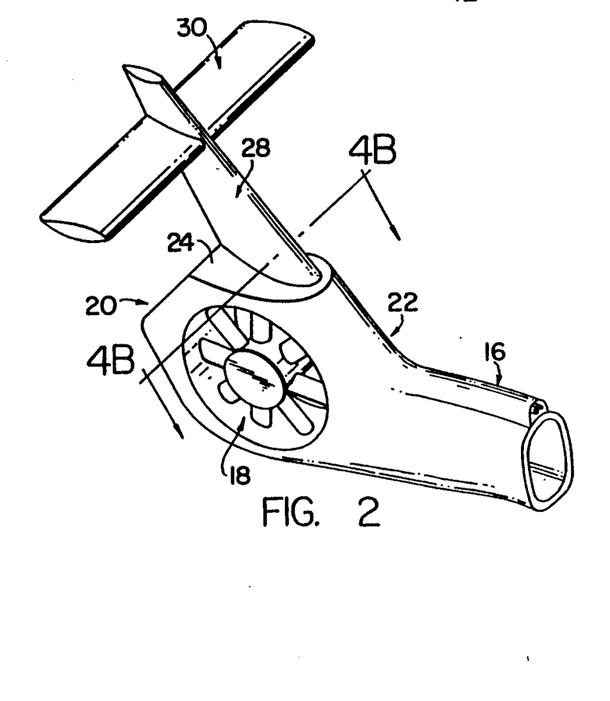
FIG. 2 is a first computerized perspective view of one embodiment of the integrated empennage structure.
Figure 3:
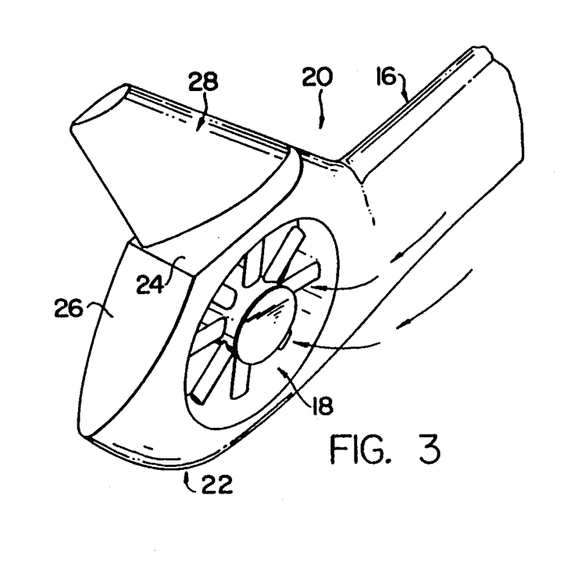
FIG. 3 is a second computerized partial perspective view of the integrated empennage structure.

An exemplary empennage structure 20 for a helicopter 10 is illustrated in further detail in FIGS. 2, 3. The empennage structure 20 includes a shroud 22 integral with the tail boom 16, a shroud-fin integration shelf 24, an aft shroud closure 26, a vertical fin or stabilizer 28, and a horizontal fin or stabilizer 30 intersecting the vertical stabilizer 28. The ducted fan antitorque device 18 is mounted in the shroud 22.

Those skilled in the art will appreciate that the overall aerodynamic performance and effects of the fan-shroud integration shelf 24 and the aft shroud closure 26 of the present invention depend upon both the characteristics of the individual elements comprising the empennage structure 20 and the ducted fan antitorque device 18 and the interactive relationships among these individual elements. The subject matter of the present invention is directed to the characteristics of the fan-shroud integration shelf 24 and the aft shroud closure 26. The empennage structure including the shroud 22, the vertical stabilizer 28, and the horizontal stabilizer 30 and the shroud-fan integration shelf 24 and the ducted fan antitorque device 18 mounted in the shroud 22 of the empennage structure 20 are the subject matter of co-pending patent applications entitled INTEGRATED HELICOPTER EMPENNAGE STRUCTURE U.S. Ser. No. 07/683,903 and HELICOPTER ANTITORQUE DEVICE U.S. Ser. No. 07/683,904, respectively. A brief description of the characteristics of these elements is presented in the following paragraphs to facilitate a better understanding of the characteristics of the subject matter of the present invention.

The aerodynamic configurations and/or orientations and the spatial orientations of the shroud 22, vertical stabilizer 28, and the horizontal stabilizer 30 comprising the integrated empennage structure 20 are optimized to provide the necessary aerodynamic forces required for helicopter 10 flight operations. Lateral or antitorque thrust is provided by the empennage structure 20 and the ducted fan antitorque device 18 for yaw stability and directional control of the helicopter 10 in the hover and forward flight regimes. The empennage structure 20 also provides vertical force components for pitch static stability and maneuverability in forward flight operations.

Figures 4A, 4B:
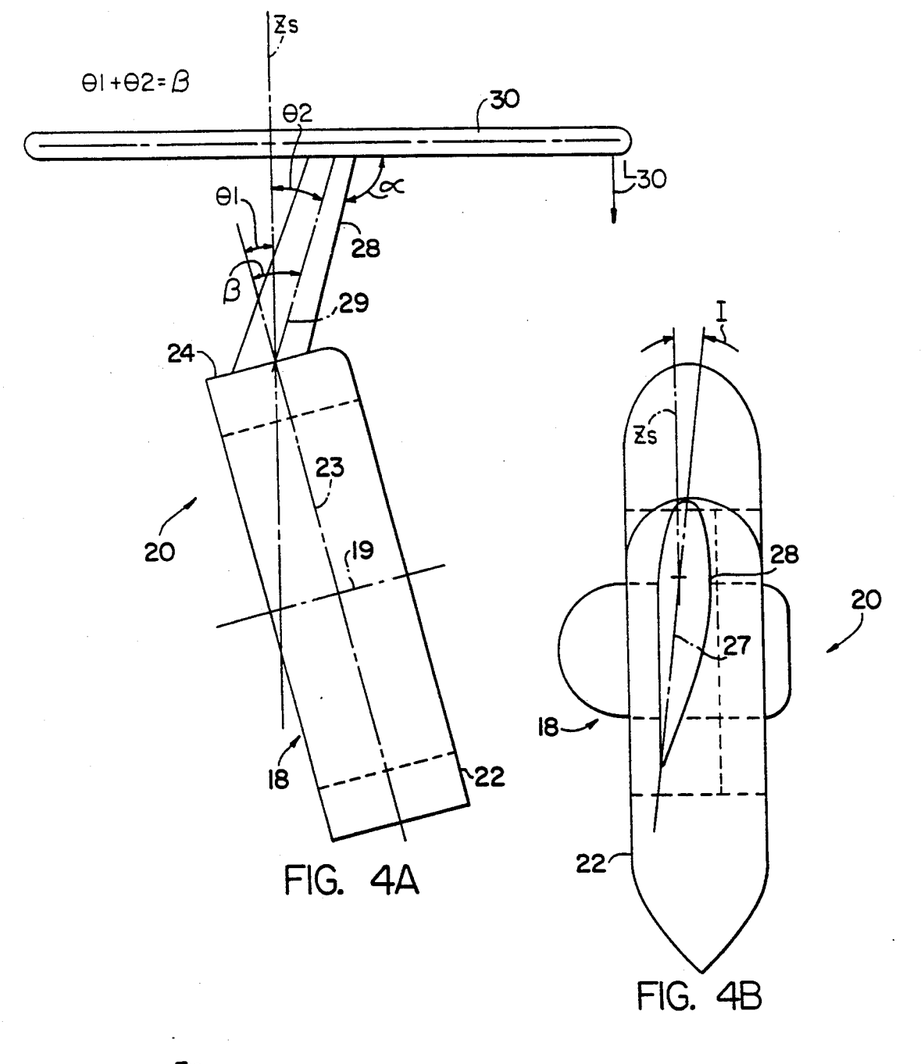
FIG. 4A is a schematic view illustrating the spatial orientation of another embodiment of an empennage structure according.
FIG. 4B is a cross-sectional plan view of the integrated empennage structure of FIG. 2 taken along line 4B—4B.

The spatial orientation of the shroud 22 housing the ducted fan antitorque device 18 and the spatial orientation of the vertical stabilizer 28 are integrated (interactively related) to provide enhanced aerodynamic performance for the helicopter 10 in the hover and forward flight regimes. In the embodiment of FIG. 4A, the shroud 22 is spatially orientated at a first predetermined cant angle with respect to the vertical plane Zs. The vertical stabilizer 28 is spatially orientated at a second predetermined cant angle with respect to the vertical plane Zs. The second predetermined cant angle is opposite in rotational sense to the first predetermined cant angle with respect to the vertical plane Zs.

The spatial orientation of the shroud 22, which contains the ducted fan antitorque device 18, improves the aerodynamic performance of the helicopter 10 in the hover regime by providing a positive vertical lift component as described in further detail hereinbelow. The spatial orientation of the shroud 22 also improves the center of gravity (C.G.) range of the helicopter 10 in the hover and cruise regimes.

Utilizing the ducted fan antitorque device 18 to provide antitorque thrust in higher speed flight regimes is aerodynamically inefficient inasmuch as such utilization of the ducted fan antitorque device 18 incurs a large drag penalty. This drag penalty is a result of the large volume of air flowing along the helicopter shroud 22 that would have to be turned into and ingested by the ducted fan antitorque device 18 during high speed forward flight (see FIG. 3). Turning and ingesting such a large volume air flow would create a large momentum drag.

To minimize drag in higher speed forward flight regimes and to simultaneously provide the required antitorque thrust required for yaw stability of the helicopter 10, the empennage structure 20 incorporates an optimally configured vertical stabilizer 28 to provide the majority of the required antitorque thrust in higher speed forward flight regimes. A 30% reduction in drag penalty may be achieved by utilizing the vertical stabilizer 28 to off-load the ducted fan antitorque device 18 in higher speed flight regimes since the aerodynamic configuration and orientation of the vertical stabilizer 28 is optimized to provide a higher lift to drag ratio than the ducted fan antitorque device 18.

The vertical stabilizer 28 is aerodynamically configured with a predetermined camber and/or aerodynamically orientated at a predetermined angle of incidence. The vertical stabilizer 28, as a result of its spatial orientation (predetermined cant angle), in combination with the aerodynamic configuration and/or orientation thereof, allows progressive off-loading of the ducted fan antitorque device 18 with increasing speeds in the forward flight regimes (off-loading is achieved by reducing the pitch angle of the tail rotor blades as speed increases).

The vertical stabilizer 28 provides the major portion (greater than 60% for the embodiment of FIGS. 1-3) of the antitorque thrust necessary for speed flight regimes.

At high speed forward flight yaw stability of the helicopter 10 in the higher regimes, the ducted fan antitorque device 18 is not completely off-loaded, but rather is effectively off-loaded to such a degree that the ducted fan antitorque device 18 is still providing a target level of reduced thrust, for example about 150 pounds in the embodiment of FIGS. 1-3.

The integrated empennage structure 20 further comprises an aerodynamically configured and orientated horizontal stabilizer 30 that is optimized, in relation to a predetermined configuration and/or orientation of the vertical stabilizer 28, to provide negative vertical forces for dynamic pitch stability of the helicopter 10 in the forward flight regimes. The horizontal stabilizer 30 is disposed in intersecting combination with the vertical stabilizer 28 to minimize main rotor assembly 14 wake impingement effects.

The shroud 22, the vertical stabilizer 28 and the horizontal stabilizer 30 comprising the empennage structure 20 are illustrated in the embodiment of FIG. 4A, a rear view looking forward along the longitudinal axis X—X. The shroud 22 embodying the ducted fan antitorque device 18 is spatially orientated at a first predetermined cant angle with respect to the vertical plane of symmetry Zs of the helicopter fuselage 12. The vertical stabilizer 28 is spatially orientated at a second predetermined cant angle with respect to the vertical plane Zs. The second predetermine cant angle is opposite in rotational sense to the first predetermined cant angle with respect to the vertical plane Zs, as illustrated in FIG. 4A, such that the effective angular displacement between the medial plane 23 of the shroud 22 and the vertical stabilizer 28 is the sum of the first and second predetermined cant angles. Such a spatial orientation allows the horizontal stabilizer 30 to be advantageously mounted in substantially symmetrical relation with respect to the vertical stabilizer 28, as described in further detail hereinbelow.

The shroud 22 embodying the ducted fan antitorque device 18 is spatially orientated (canted) at a first predetermined cant angle $\Theta 1$ relative to the vertical plane $Z_s$ (as illustrated in FIG. 4A, the cant angle $\Theta 1$ between the medial plane 23 of the shroud 22 and the vertical plane Zs). The magnitude of the first predetermined cant angle $\Theta 1$ is determined by such operating constraints as the cross coupling effects experienced during control range inputs to the ducted fan antitorque device 18, particularly with respect to heading tolerance limits, and the specific design mission of the helicopter 10.

Based upon a control range input to the ducted fan antitorque device 18 of about −35 to about +50 degrees of pitch and other operating constraints as exemplarily described hereinabove, the inventors have defined a range for the magnitude of the first predetermined cant angle $\Theta 1$ of greater than 0° to about 20°. The magnitude of the first predetermined cant angle $\Theta 1$ for the one preferred embodiment is about 13°.

The vertical stabilizer 28 is spatially orientated (canted) at a second predetermined cant angle $\Theta 2$ relative to the vertical plane $Z_s$ (as illustrated in FIG. 4A, the cant angle $\Theta 2$ between the medial plane 29 of the vertical stabilizer 21, at the forward edge thereof, and the vertical plane Zs). The magnitude of the second predetermined cant angle $\Theta 2$ is based upon the magnitude of the first predetermined cant angle $\Theta 1$. The second predetermined cant angle $\Theta 2$ has a magnitude at least as great as the magnitude of the first predetermined cant angle $\Theta 1$ to ensure that the intersection angle $\alpha$ between the vertical stabilizer 28 and the horizontal stabilizer 30 is greater than 90°. This characteristic minimizes aerodynamic interference between the vertical and horizontal stabilizers 28, 30.

The inventors have defined a range for the magnitude of the second predetermined cant angle $\Theta 2$ based upon the minimization of aerodynamic interference effects between the vertical and 15° greater than the first predetermined cant horizontal stabilizers 28, 30 of about 0° to about angle $\Theta 1$, and preferably about 5° to about 10° greater. The magnitude of the second predetermined cant angle $\Theta 2$ for the embodiment of FIG. 4 is about 20°.

An examination of FIG. 4A shows that the spatial orientation of the shroud 22 is opposite in sense to the spatial orientation of the vertical stabilizer 28. That is, the first predetermined cant angle $\Theta 1$ is counterclockwise with respect to the vertical plane Zs while the second predetermined cant angle $\Theta 2$ is clockwise with respect to the vertical plane Zs. The effective angular displacement $\beta$ between the shroud 22 and the vertical stabilizer 28 is the sum of the first predetermined cant angle $\Theta 1$ and the second predetermined cant angle $\Theta 2$. The relative spatial relationship between the shroud 22 and the vertical stabilizer 28 of the empennage structure 20 defines an integrated shroud 22, vertical stabilizer combination 28 that provides antitorque thrust in the hover and forward speed flight regimes for yaw stability and direction control, provides a positive vertical lift component in the hover regime to increase the lift capability of the helicopter 10, effectively off-loads the ducted fan antitorque device 18 in the higher speed forward flight regimes to enhance helicopter aerodynamic performance in these flight regimes, and provides a negative vertical force component for dynamic pitch stability in the forward flight regimes The vertical stabilizer 28 is aerodynamically configured and/or orientated with a predetermined camber C and a predetermined angle of incidence I, respectively, to provide off-loading of the ducted fan antitorque device 18 in the higher speed forward flight regimes For the embodiment illustrated in FIGS. 1-3, a NASA $63_3A618$ airfoil section (providing a 4° effective incidence through its predetermined camber C) was selected as the airfoil configuration for the vertical stabilizer 28 to provide the lateral force necessary to effectively off-load the ducted fan antitorque device 18 in the higher speed forward flight regimes. Other relevant dimensions of the one preferred embodiment of the vertical stabilizer 28 include a stabilizer area S of about 25 ft², a span b of about 7.5 ft (90 inches), a mean chord $C_m$ of about 38.5 inches, and an aspect ratio AR of about 2.35.

A predetermined angle of incidence I for the vertical stabilizer 28 is exemplarily illustrated in FIG. 4B, and is defined as the angle I between the chord 27 of the vertical stabilizer 28 and the vertical plane Zs. One selection criteria for the predetermined angle of incidence I is a magnitude sufficient for the vertical stabilizer 28 to develop an aerodynamic lifting force that effectively off-loads the ducted fan antitorque device 18 to a target value in the higher speed forward flight regimes. For the embodiment of FIGS. 1-3, with an off-load target value of about 150 pounds, the predetermined angle of incidence I was about 6.5°. The vertical stabilizer 28, with a 6.5° angle of incidence, provides about 40% of the antitorque thrust required at a forward speed of about 120 knots, and more than 60% of the required antitorque thrust at $V_{max}$ (about 155 knots).

Figure 4C:
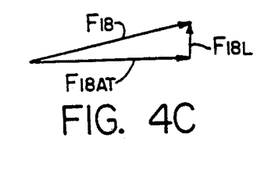
FIG. 4C illustrates the thrust diagram for the ducted fan antitorque device of the integrated empennage structure of FIG. 4A.

A thrust diagram for the ducted fan antitorque device 18 embodied in the empennage structure 20 is depicted in FIG. 4C. Mass airflow influx into the ducted fan antitorque device 18, as depicted in FIG. 3, is regulated to produce a thrust $F_{18}$ acting along the axis 19 of the ducted fan antitorque device 18 (the generated thrust $F_{18}$ is directed outwardly from the same side of the ducted fan antitorque device 18 as the mass airflow influx). Since the axis 19 of the ducted fan antitorque device 18 is offset with respect to the transverse axis Y—Y by the first predetermined cant angle $\Theta 1$ (due to the spatial orientation of the shroud 22), the generated thrust $F_{18}$ may be resolved into an antitorque thrust component $F_{18AT}$ in the direction of the transverse axis Y—Y and a positive vertical force component $F_{18L}$ in the direction of the vertical axis Z—Z.

Figure 4D:
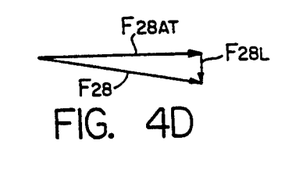
FIG. 4D illustrates the thrust diagram for the vertical stabilizer of the integrated empennage structure of FIG. 4A.

A force diagram for the vertical stabilizer 28 preceding paragraphs is depicted in FIG. 4D. Mass airflow over the vertical stabilizer 28 produces an aerodynamic lifting force $F_{28}$ due to the aerodynamic configuration and orientation of the vertical stabilizer 28. Since the vertical stabilizer 28 is offset with respect to the transverse axis Y—Y by the second predetermined cant angle $\Theta 2$, the lifting force $F_{28}$ produced by mass airflow over the vertical stabilizer 28 may be resolved into an antitorque force component $F_{28AT}$ in the direction of the transverse axis Y—Y and a negative vertical force component $F_{28L}$ in the direction of the vertical axis Z—Z.

In the hover regime, the antitorque thrust component $F_{18AT}$ produced by the ducted fan antitorque device 18 provides the antitorque force to counterbalance the moment-inducing effects of the main rotor assembly and to provide yaw directional control. In translational-to-low forward flight regimes, the antitorque force to counterbalance the moment-inducing effects of the main rotor assembly is provided by a combination of the antitorque thrust component $F_{18AT}$ produced by the ducted fan antitorque device 18 and the antitorque force component $F_{28AT}$ produced by mass airflow over the vertical stabilizer 28 (the ducted fan antitorque device 18 is progressively off-loaded at higher speeds by the vertical stabilizer 28) to minimize aerodynamic stresses on the fan assembly of the ducted fan antitorque device 18. In higher speed forward flight regimes, the majority of the antitorque force is effectively provided by the antitorque force component $F_{28AT}$ produced by mass airflow over the vertical stabilizer 28.

The negative vertical force component $F_{28L}$ provided by the vertical stabilizer 28 complements the negative lifting force $L_{30}$ (see FIG. 4A) provided by the horizontal stabilizer 30. Consequently, the aerodynamic functioning of the vertical stabilizer 28 allows the aerodynamic configuration and/or orientation of the horizontal stabilizer 30 to be reduced. These reductions result in weight savings and/or improved aerodynamic efficiency (through reduction in induced drag) for the empennage structure 20.

Furthermore, the aerodynamic effects produced by the aerodynamic operation of the vertical stabilizer 28 facilitates a substantially symmetrical attachment of the horizontal stabilizer 30 in combination with the vertical stabilizer 28 as illustrated in FIG. 4A. Smaller dynamic forces are transferred through the attachment fitting with the result that the fitting may be reduced in size and weight. In addition, aerodynamic interference between the cambered surfaces of the vertical and horizontal stabilizers 28, 30 is minimized by the obtuseness of the intersection angle $\alpha$ between the horizontal and vertical stabilizers 28, 30, which effectively spaces the respective suction surfaces of the vertical and horizontal stabilizers 28, 30 a greater distance apart.

The horizontal stabilizer 30 is aerodynamically configured and orientated to optimize the dynamic pitch stability of the helicopter 10 in the forward flight regimes. The horizontal stabilizer 30 has an unswept planform and a relatively high aspect ratio. For the embodiment of FIGS. 1-3, the horizontal stabilizer 30 has an aerodynamic configuration that includes an area S of about 19 ft$^2$, a span b of about 8.45 feet (101 inches), a mean chord Cm of about 27, and an aspect ratio AR of about 3.75. This embodiment incorporates an SU3015 airfoil section (Sikorsky uncambered, 15% thick, 30 series airfoil).

With reference to FIG. 2, the horizontal stabilizer 30 is mounted in combination with the vertical stabilizer 28 to define a cruciform empennage configuration. It is within the scope of the present invention to attach the horizontal stabilizer 30 in combination with the vertical stabilizer 28 to define a "T" configuration. In either embodiment, the horizontal stabilizer 30 is attached at a high vertical stabilizer 28 location to minimize main rotor blade wake impingement effects on mass airflow over the horizontal stabilizer 30. The angle of incidence of the horizontal stabilizer 30 is relatively low, and is based upon a compromise between longitudinal control margins and vibrations induced by the wake from the main rotor assembly 14. For the one preferred embodiment, an angle of incidence of $-3°$ ($\pm 5°$) provides satisfactory dynamic pitch stability.

A more detailed description of the structural and functional characteristics of the shroud 22, the vertical stabilizer 28, and the horizontal stabilizer 30 comprising the empennage structure 20 is presented in commonly-owned, co-pending patent application entitled INTEGRATED HELICOPTER EMPENNAGE STRUCTURE U.S. Ser. No. 07/683,903, which is incorporated herein by reference.

The ducted fan antitorque device 18 has a configuration that is optimized to provide the antitorque thrust required by the helicopter 10 for yaw stability and maneuverability in hover and forward flight operations. The ducted fan antitorque device 18 also provides a vertical lift component that contributes to the general lift capability of the helicopter 10. Concomitantly, the configuration of the ducted fan antitorque device 18 is optimized to reduce the operating noise levels of the ducted fan antitorque device 18.

The design dimensions of the ducted fan antitorque device 18 and the operating characteristics thereof such as fan thrust and fan control range are based upon the mission requirements that the helicopter 10 must be capable of achieving. For example, one such set of operating constraints that may drive the design dimensions of the ducted fan antitorque device 18 for one preferred embodiment are a fan power/control range to provide maximum antitorque thrust in hover in a 45 knot right crosswind and a yaw acceleration of 0.85 rad/sec$^2$ (50 deg/sec$^2$) in a light crosswind (up to about 15 knots). These operating constraints define a helicopter having an antitorque thrust generating capability to achieve a 180° hover turn, stop-to-stop, in five second in light crosswinds.

Figures 5A, 5B:
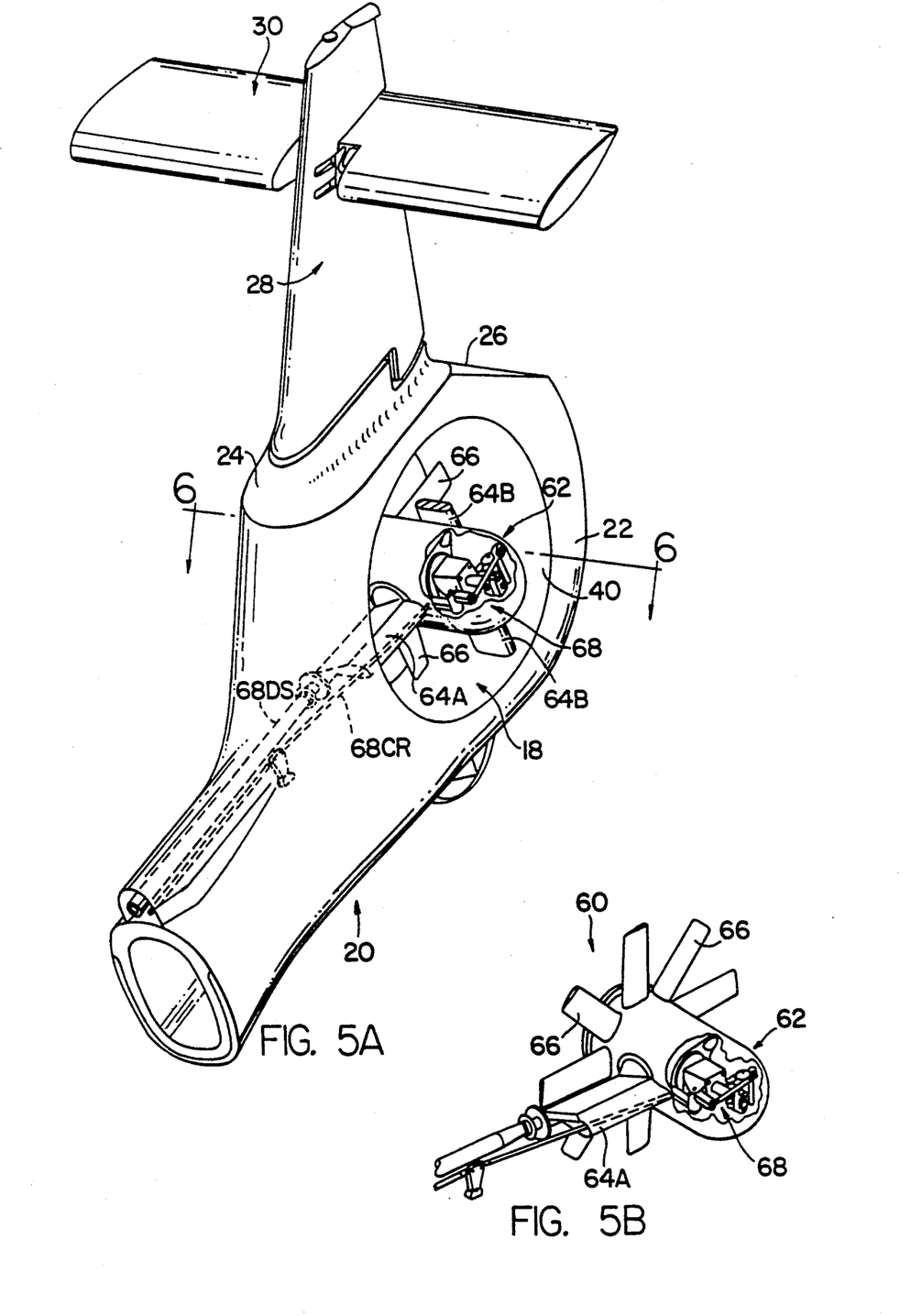
FIGS. 5A, 5B are perspective views illustrating an embodiment of the ducted fan antitorque device.
Figure 6:
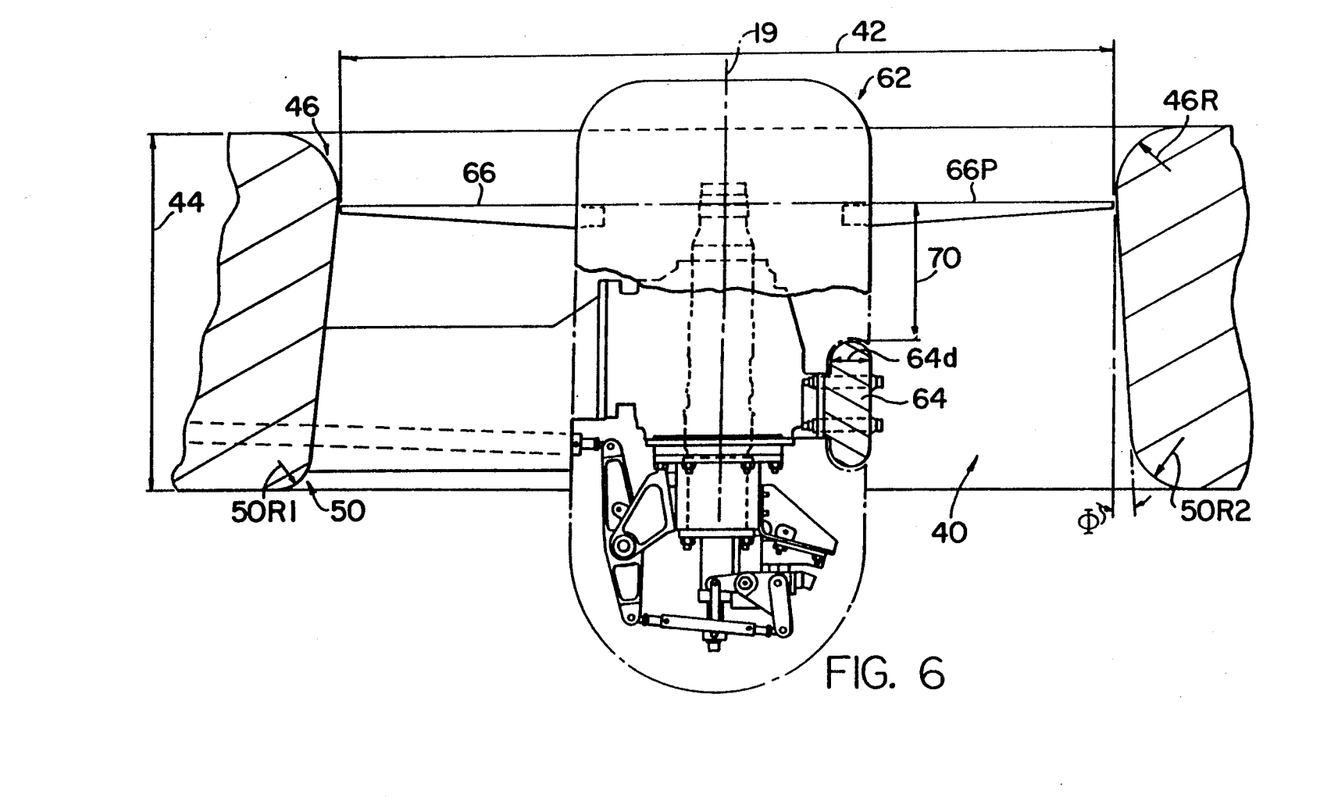
FIG. 6 is a cross-sectional view of the ducted fan antitorque device of FIG. 5A taken along line 6—6 thereof.

With reference to FIGS. 5A, 5B, 6, the ducted fan antitorque device 18 according to the present invention comprises an airflow duct 40 and a fan assembly 60 mounted within the duct 40. The duct 40 is disposed in combination within the shroud 22 so that the axis 19 of the ducted fan antitorque device 18 is substantially perpendicular to the medial plane of the shroud 22. The resultant spatial orientation of the ducted fan antitorque device 18, with the shroud 22 spatially orientated as described here in above, is such that the axis 19 is offset relative to the transverse axis Y—Y of the helicopter 10 by the first predetermined cant angle $\Theta 1$.

The configuration of the airflow duct 40 includes a duct diameter 42, a duct width 44 (transverse dimension), an inlet 46 having an inlet lip configuration 46R of predetermined constant radius, a divergent duct portion 48, and an outlet 50 having an outlet lip configuration 50R of predetermined, variable radius. The configurations and dimensions of various elements comprising the duct 40 influence the overall aerodynamic performance of the ducted fan antitorque device 18 according to the present invention.

Constraints such as main rotor diameter, engine power available, and the size of the fan assembly 60 affect the sizing of the duct diameter 42. The embodiment illustrated in FIGS. 1–3 has a duct diameter 42 (as measured at the plane of the tail rotor blades—see FIG. 6) of about 4 feet. The embodiment illustrated in FIG. 4A has a duct diameter 42 of about 4.5 feet.

Optimally a duct width (transverse dimension) 44 to diameter (L/D) ratio of 1.0 maximizes antitorque thrust production by the ducted fan antitorque device 18 (the L/D ratio is based upon the diameter of the fan assembly 60, which for descriptive purposes is assumed to be equal to the duct diameter 42). A duct width 44 equal to the diameter, however, is not a practical consideration for the empennage structure 20 since this would result in a large shroud 22 width (transverse dimension) which would result in an empennage structure 20 of excessive weight. A primary factor in determining duct width 44 from a pragmatic perspective is the separation distance between the plane of the tail rotor blades and the leading edge of the hub support struts. The inventors have determined that an L/D ratio of about 0.4 provides a ducted fan antitorque device 18 configuration capable of effectively providing the required level of antitorque thrust. For one preferred embodiment, the airflow duct 40 has a duct width 44 of about 1.8 feet.

The inlet 46 is configured to provide the fan assembly 60 with mass airflow having an attached boundary layer and a relatively uniform velocity distribution, to the extent practicable. It has been determined that a small radius of curvature lip 46, in combination with a downstream divergent duct portion 48 (following the blade plane of the fan assembly 60) provides good performance in both the hover and higher speed flight regimes. For one preferred embodiment, the ducted fan antitorque device 18 has an inlet radius 46R of about 4 inches.

The divergent duct portion 48 of the airflow duct 40 (defined as that portion of the duct 40 downstream from the plane of the tail rotor blades of the fan assembly 60) in combination with the configuration of the outlet 50 effects the shape of the mass airflow efflux, which in turn influences the performance of the ducted fan antitorque device 18. The divergent duct portion 48 and the outlet 50 are configured to prevent separation of the mass airflow from the duct 40 and to eliminate slipstream contraction aft of the ducted fan antitorque device 18. An effective interaction between the divergent duct portion 48 and the outlet 50 provides an increase in mass airflow influx into the ducted fan antitorque device 18 during flight operations.

The configuration of the divergent duct portion 48 facilitates pressure recovery on the duct 40. An excessive divergence angle, however, will degrade reverse thrust operation (mass airflow through the duct 40 is reversed in nose-right sideslip flight conditions such that the inlet 44 functions as the outlet and vice versa). A duct divergence angle $\Phi$ (see FIG. 6) of about 5° provides attached mass airflow through the divergent duct portion 48 of the duct 40, and also provides satisfactory performance during reverse thrust operations.

Figure 7:
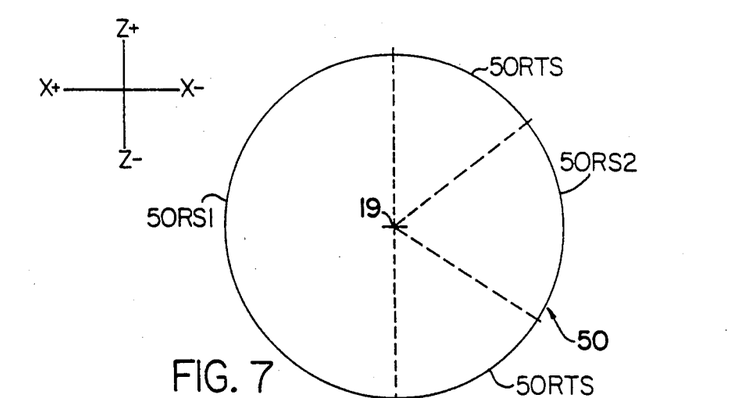
FIG. 7 is a plan view of the outlet of the ducted fan antitorque device of FIG. 6.

An outlet 50 having a curved lip configuration 50R of variable radius improves the reverse thrust capability of the ducted fan antitorque device 18 according to the present invention, and in addition, reduces the parasite drag of the ducted fan antitorque device 18 in forward flight regimes. A plan view of one preferred embodiment of the outlet 50 depicting the curved lip configuration 50R of variable radius is illustrated in FIG. 7. The longitudinal and vertical axes X—X, Z—Z of the helicopter 10 are illustrated to provide a frame of reference, X+ indicating the longitudinal axis in the forward flight direction of the helicopter 10.

The curved lip configuration 50R includes a first constant radius lip segment 50RS1, a second constant radius lip segment 50RS2, and intermediate variable radius transition segments 50RTS that provide a smooth structural transition between the first and second constant radius lip segments 50RS1, 50RS2. The first constant radius lip segment 50RS1 has a radius of curvature R1 that is less than the radius of curvature R2 of the second constant radius lip segment 50RS2. For one preferred embodiment, the first constant radius lip segment 50RS1 has a radius of curvature R1 of about 0.5 inches and the second constant radius lip segment 50R2 has a radius of curvature R2 of about 4 inches. As illustrated in FIG. 7, the first constant radius lip segment 50RS1 encompasses a 180. sector of the curved lip configuration 50 (sector is symmetrically disposed with respect to the longitudinal axis in the forward direction) and the second constant radius lip segment 50RS2 encompasses a 90° sector of the curved lip configuration 50 (sector is symmetrically disposed with respect to the longitudinal axis in the aft direction).

With reference to FIGS. 5A, 5B, the fan assembly 60 includes an aerodynamically-shaped hub structure 62, a plurality of aerodynamically configured support struts 64 for mounting the hub structure 62 in the airflow duct 40, and a plurality of tail rotor blades 66 rotatably attached to the hub structure 62. The tail rotor blades 66 are aerodynamically configured and manipulable for the generation of thrust. The hub structure 62 functions as a housing for fan assembly operating subsystems 68 such as the tail rotor gearbox and the servo controls for regulating the operation (pitch changes) of the tail rotor blades 66. The hub structure 62 also functions as the rotational mount for the tail rotor blades 66.

The plane 66P of the tail rotor blades 66 is transverse to the axis 19 of the ducted fan antitorque device 18 and is located immediately downstream of the curvature termination point of the inlet lip radius 46R, as illustrated in FIG. 6. The separation distance 70 between the blade plane 66P and the leading edges of the support struts 64 should be relatively large, on the order of magnitude of about 2.0 to about 2.5 times the strut dimension 64d.

The support struts 64 have an elliptical configuration to minimize turbulence and vortex shedding. Elliptically configured support struts 64 reduce loading on the tail rotor blades 66 during normal operation of the ducted fan antitorque device 18, and concomitantly, the induced loading noise, and reduce thrust losses due to separation drag. The elliptical configuration also reduces turbulence ingestion in the reverse thrust condition. Minimally the elliptical configuration for the support struts 64 should be a 2:1 ellipse, and preferably a 3 to 3.5:1 ellipse.

The ducted fan antitorque device 18 utilizes three elliptically-configured support struts 64 that function as structural supports to coaxially mount the hub structure 62 within the airflow duct 40. A first support strut 64A is a radially disposed (with respect to the axis 19), longitudinally orientated (with respect to the helicopter axes) aerodynamically-configured support structure extending between the hub structure 62 and the airflow duct 40. The other two aerodynamically-configured support struts 64B are radially off-set from the axis 19, i.e., provide non-radial mounting structures between the hub structure 62 and the shroud 22. These support struts 64B are collinear with respect to one another and vertically orientated (with respect to the helicopter axes).

The tail rotor subsystem is a rigid rotor having plurality of tail rotor blades 66. Eight (8) tail rotor blades 66 were selected for the tail rotor subsystem of the ducted fan antitorque device 18 based upon acoustic, reliability, durability, and survivability considerations. The rotor blades 66 have an untapered planform configuration which provides maximum thrust generating capability and simplifies blade manufacturing procedures. The airfoil section of the tail rotor blades 66 is a NACA 64 series such as the 64A322 airfoil which provides the best performance at the design tip speed over the required range of operating conditions. Each rotor blade 66 has a predetermined chord to provide high solidity to meet a yaw acceleration design performance requirement of 0.85 rad/sec$^2$ and low blade loading. For one preferred embodiment, the predetermined chord is about 0.55 ft. Each rotor blade 66 has a predetermined twist of about $-7°$ twist hub-to-tip to provide good control response, particularly at low and negative thrust levels.

The tail rotor blades 66 are operative for bottom blade forward (BBF) rotation to minimize interference effects with the main rotor wake. The pitch control range of the tail rotor blades 66 has been increased to permit pitch control regulation over a wide control range for thrust variation for enhanced maneuverability, particularly in effecting new maneuvers, as discussed briefly hereinbelow. The control rod 68CR of the fan assembly operating subsystems 68 provides the means for effecting such pitch changes. For the one preferred embodiment, the control range for the tail rotor blades 66 is about $-35°$ to about $+50°$. The 50° positive pitch limit was selected to coincide with the onset of stall of the tail rotor blades 66 in the hover regime. The operating tip speed for the tail rotor blades 66 was selected based upon noise considerations, a lower blade tip speed reducing both the amplitude and the frequency of blade tip generated noise. For one preferred embodiment, a blade tip speed of about 600 ft/sec, reducible to about 540 ft/sec by the pilot, was chosen.

Due to the characteristics of the mass airflow influx into the ducted fan antitorque device 18 during operation thereof, the inlet lip configuration 46 and portions of the shroud 22 adjacent thereto function as aerodynamic lifting surfaces in hover and forward flight regimes to provide thrust augmentation, i.e., thrust over and above that produced by the fan assembly 60 of the ducted fan antitorque device 18. The thrust augmentation provided by the inlet lip configuration 46 and adjacent portions of the shroud 22 is a result of the reduced static pressure in these regions as a result of fan assembly 60 induced velocities in the mass airflow influx.

For an ideal ducted fan antitorque device, suction as a result of the reduced static pressure RSP is equal in magnitude to the thrust produced by the ducted fan antitorque device, resulting in an optimum thrust augmentation factor of two. In right and left sideslip flight conditions, the optimum thrust augmentation factor decreases and increases, respectively, due to induced velocity dependence. In the forward flight regimes, the thrust increment due to the inlet lip configuration is greater than the hover value due to stoppage of the mass airflow influx momentum and the re-expansion of stagnated mass airflow from the duct outlet.

For the ducted fan antitorque device 18 as described in the preceding paragraphs, actual thrust augmentation is approximately equal to optimum thrust augmentation for the hover and sideward flight regimes of the helicopter 10. Actual thrust augmentation in the forward flight regimes is close to the ideal value of two, although some loss of lift is experienced due to free stream turning of the mass airflow influx.

The shroud-fin integration shelf 24 according to the present invention is structurally configured to alleviate performance-degrading aerodynamic effects occurring during particular flight conditions by helicopters embodying a ducted fan antitorque device. More particularly, in transitioning between nose-left and nose-right sideslips at medium to high speeds (about 100 knots and above), it has been observed that helicopters embodying ducted fan antitorque devices experience a marked difference in trim characteristics, which adversely affects the handling qualities of the helicopter.

The inventors have determined that the aerodynamic effectiveness of the vertical stabilizer of the empennage structure is adversely affected in nose-right sideslip flight conditions, thereby causing the noticeable differentiation in helicopter handling characteristics. For helicopters utilizing clockwise main rotor rotation, these characteristics will be apparent in the nose-left sideslip flight regimes (all references to inlet/exit and right/left orientations will be reversed). In nose-right sideslip conditions, the helicopter is so orientated that the outlet of the ducted fan antitorque device is subjected to the relative wind mass airflow, which causes the ducted fan antitorque device to operate in a reverse thrust condition. This reverse thrust condition results in a mass airflow that interferes with the aerodynamic operation of the vertical stabilizer of the empennage structure.

Figures 8, 9:
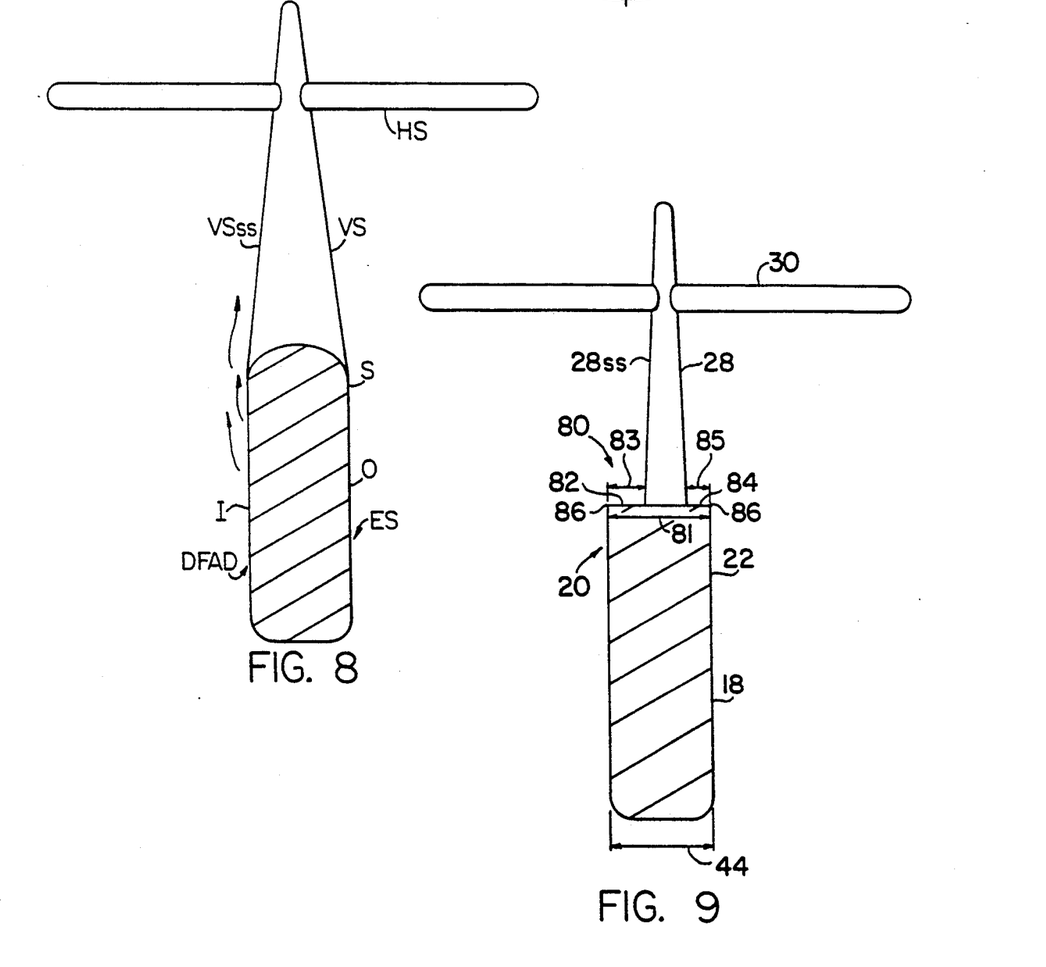
FIG. 8 illustrates the configuration of a prior art embodiment of the empennage structure.
FIG. 9 illustrates a shroud-fin integration shelf according to the present invention for the integrated empennage structure.

To better understand the aerodynamic effects on an empennage structure embodying a ducted fan antitorque device which is operating in the reverse thrust condition, reference may be had to FIG. 8 illustrating a cross-sectional view of such an empennage structure ES. The view of FIG. 8 is along the longitudinal axis X—X of the helicopter looking aftwardly. The empennage structure ES includes a ducted fan antitorque device DFAD mounted in a shroud S, a vertical stabilizer VS, and a horizontal stabilizer HS. Mass airflow influx into the ducted fan antitorque device DFAD, in the reverse thrust condition, is via the outlet O while mass airflow efflux is via the inlet I (opposite to normal operating conditions as described hereinabove). The mass airflow in the reverse thrust condition causes the ducted fan antitorque device DFAD to produce negative thrust, i.e., thrust opposite in direction to the thrust produced by the ducted fan antitorque device DFAD during normal operations, as exemplarily illustrated in FIG. 4A.

Due to the configuration of the inlet I of the ducted fan antitorque device DFAD, which has a curved lip of constant radius to facilitate mass airflow influx into the ducted fan antitorque device DFAD (see disclosure hereinabove), mass airflow exiting via the inlet I in the reverse thrust operating condition does not readily separate from the curved lip inlet I. This attached airflow moves upwardly along the shroud S, as schematically illustrated in FIG. 8, and over the suction surface $VS_{ss}$ of the vertical stabilizer VS. Such mass airflow causes aerodynamic interference with the longitudinal mass airflow over the vertical stabilizer VS produced by the forward motion of the helicopter. This aerodynamic interference reduces the lifting force produced by the vertical stabilizer VS.

The reduction in the lifting force produced by the vertical stabilizer VS, in combination with the negative thrust being produced by the ducted fan antitorque device DFAD in the reverse thrust operating condition, results in a reduction in the amount of thrust the ducted fan antitorque device DFAD has to provide in nose-right sideslip flight conditions. Thus, in transitioning from nose-right to nose-left sideslip flight conditions, there are significant changes in the lateral forces produced by the vertical stabilizer and the ducted fin antitorque device.

The shroud-fin integration shelf 24 according to the present invention has an asymmetrical structural configuration dimensioned to eliminate the adverse aerodynamic effects experienced by the vertical stabilizer in reverse thrust operating conditions. The shroud-fin integration shelf 24 has a configuration that provides an acute transition (step change in cross section) between the shroud 22 and the vertical stabilizer 28 on both lateral sides of the empennage, and in particular, the lateral side of the empennage structure 20 that includes the inlet 46 of the ducted fan antitorque device 18. The acute transition configuration of the shroud-fin integration shelf 24 functions to separate the attached mass airflow that would flow along the shroud 22 in the reverse thrust condition so that such mass airflow does not flow over the suction surface $28_{ss}$ of the vertical stabilizer 28 and interfere with the longitudinal mass airflow over the vertical stabilizer 28 due to the forward motion of the helicopter 10.

With reference to FIG. 9, which is a cross-sectional view looking aftwardly along the longitudinal axis X—X of the helicopter 10, the shroud-fin integration shelf 24 of the present invention is a planar member 80 having a predetermined overall shelf width 81. The predetermined width 81 corresponds to the width of the shroud 22, which as described hereinabove, is equivalent to the duct depth 44 of the ducted fan antitorque device 18.

The shelf member 80 of the shroud-fan integration shelf 24 may be further defined as including a first shelf member 82 and a second shelf member 84. With reference to FIG. 9, the first shelf member 82 defines the distance between the edge of the shroud 22 on the inlet side of the ducted fan antitorque device 18 and the suction surface $28_{ss}$ of the vertical stabilizer 28. The second shelf member 84 defines the distance between the edge of the shroud on the outlet side of the ducted fan antitorque device 18 and the corresponding surface of the vertical stabilizer 28.

The first shelf member 82 has a width 83 greater than the width 85 of the second shelf member 84 due to the requirement to ensure the attached mass airflow over the shroud 22 during reverse thrust conditions is sharply separated at the fan-shroud integration shelf 24 so that such mass airflow does not flow across the suction surface $V_{ss}$ and interfere with the aerodynamic operation of the vertical stabilizer 28. The outlet 50 of the ducted fan antitorque device 18, as described hereinabove, has a configuration that facilitates separation of mass airflow exiting the outlet 50 so that such mass airflow does not appreciably flow along the shroud 22 and therefore has a minimal effect on the aerodynamic operation of the vertical stabilizer 28. Accordingly, the width 85 of the second shelf member 84 may be less than the width 83 of the first shelf member 82.

The widths 83, 85 of the first and second shelf members 82, 84 are determined by the separation requirement described hereinabove and the thickness of the vertical stabilizer 28. The thickness of the vertical stabilizer 28 is based upon structural and aerodynamic efficiency considerations. Current design practice utilizes vertical stabilizers 28 having thicknesses in the range of 10–30% of the chord of the vertical stabilizer 28.

It will also be appreciated that the relative magnitudes of the widths 83, 85 of the first and second shelf members 82, 84 may vary longitudinally, fore to aft, where the vertical stabilizer 28 has a predetermined angle of incidence I as described hereinabove. This effect is schematically illustrated in FIGS. 2, 3. The magnitude of the width 83 of the first shelf member 82 will be smallest at the forward edge of the shroud-fin integration shelf 24 and largest at the aft edge of the shroud-fin integration shelf 24.

The inventors have determined that the widths 83, 85 of the first and second shelf members 82, 84 may have magnitudes in the range of about 4% to about 16% of the diameter of the fan assembly (corresponding approximately to the duct diameter 42). The selection of values for the first and second shelf widths 83, 85 is based upon the size of the vertical stabilizer 28, the angle of incidence of the vertical stabilizer 28, the airfoil section of the vertical stabilizer 28, thrust developed by the ducted fan antitorque device 18, and helicopter 10 design speed.

The configuration of a shelf edge 86, demarking the boundary between the shroud 22 and the shroud-fin integration shelf 24, is preferably sharp, i.e., approximately a 90° angle. A shelf edge 86 having a 90° structural configuration facilitates mass airflow separation at the structural interface between the shroud 22 and the shroud-fin integration shelf 24. The shelf edge 86 may be rounded to reduce the overall shelf width 80, which concomitantly reduces the effects of parasite drag. This shelf edge 86 configuration, however, does tend to vitiate the mass airflow separation function performed by the shroud-fin integration shelf 24.

The shroud-fin integration shelf 24 described in the preceding paragraphs was illustrated with respect to an empennage structure 20 wherein the vertical stabilizer 28 was uncanted with respect to the shroud 22. It will be appreciated that the aforedescribed shroud-fin integration shelf 24 has particular utility with the integrated empennage structure 20 described in co-pending application entitled INTEGRATED HELICOPTER EMPENNAGE STRUCTURE U.S. Ser. No. 07/683,903, which has been described hereinabove. The aforedescribed shroud-fin integration shelf 24 may be utilized in combination with an empennage structure 20 wherein the vertical stabilizer 28 is spatially orientated at the second predetermined cant angle $\Theta 1$.

Closure of the shroud behind the ducted fan antitorque device poses several problems. For minimum base drag in high speed forward flight, a faired trailing edge appears to be optimal. Such a configuration, however, increases the overall weight of the empennage structure and presents a large surface area during lateral flight regimes which necessitates increased power for lateral flight regimes. An empennage structure having a configuration that presents minimum area during side flight regimes, however, would have higher drag in the forward flight regimes.

Early Aerospatiale helicopters such as the Gazelle and Dauphin utilized a sharp trailing edge to terminate the shroud configuration. The yaw stability of these helicopters was not very good, the tail structure wagging laterally in forward flight regimes. Later Aerospatiale helicopters modified the empennage structure to incorporate a wide, blunt trailing edge configuration as the aft shroud closure, the blunt section on the Aerospatiale SA366 being ten inches wide at the top and about fourteen and one-half inches wide at the bottom. The configuration of such an aft shroud closure engenders a large base drag penalty.

The aft shroud closure 26 according to the present invention is exemplarily illustrated in FIG. 3. The aft shroud closure 26 has a planar configuration of approximately "V" shape. Such a configuration has a reduced base drag. The configuration of the aft shroud closure 26 commences at the trailing edge of the vertical stabilizer 28 and is angled with respect to the shroud-fin integration shelf 24, as schematically illustrated in FIG. 3. The aft shroud closure 26 functions to fix the separation points of the mass airflow over the aft portions of the shroud 26 to enhance the yaw stability characteristics of the helicopter 10.

A variety of modifications and variations of the present invention are possible in light of the above teachings. It is therefore to be understood that, within the scope of the appended claims, the present invention may be practiced otherwise than as specifically described hereinabove.

What is claimed is:

1. For a helicopter empennage structure that includes a shroud embodying a ducted fan antitorque device, an aerodynamically configured vertical stabilizer having a predetermined thickness and contiguous with the shroud, and a horizontal stabilizer intersecting the vertical stabilizer, a shroud-fin integration shelf, comprising:

shelf member means having a predetermined width and a planar configuration for providing an acute structural transition between the shroud and the vertical stabilizer and operative to separate attached mass airflow over the shroud in reverse thrust operating conditions wherein the attached mass airflow from the shroud does not interfere with the aerodynamic functioning of the vertical stabilizer, said shelf means including first shelf member means having a predetermined width for defining an acute structural transition between the vertical stabilizer and the shroud on the inlet side of the empennage structure; and second shelf member means having a predetermined width for defining an acute structural transition between the vertical stabilizer and the shroud on the outlet side of the empennage structure;

said first and second shelf member means being asymmetrical wherein said predetermined width of said first shelf member means is greater than said predetermined width of said second shelf member means.

2. The shroud-fin integration shelf of claim 1 wherein said first and second shelf member means have respective predetermined widths within the range of four to about sixteen percent of the diameter of the fan assembly of the ducted fan antitorque device.

3. The shroud-fin integration shelf of claim 2 wherein said respective predetermined widths of said first and second shelf member means in combination with the predetermined thickness of the vertical stabilizer equal said predetermined width of said shelf member means.

4. The shroud-fin integration shelf of claim 1 wherein said first and second shelf member means have shelf edges defining a boundary between said shroud-fin integration shelf and the shroud, said shelf edges having a sharp configuration.

5. The shroud-fin integration shelf of claim 1 wherein said first and second shelf member means have shelf edges defining a boundary between said shroud-fin integration shelf and the shroud, said shelf edges having a rounded configuration to reduce frontal area and parasite drag.

6. The shroud-fin integration shelf of claim 1 wherein said predetermined widths of said first and second shelf members are relatively variable longitudinally fore to aft over the empennage structure.

7. For a helicopter empennage structure that includes a shroud embodying a ducted fan antitorque device, an aerodynamically configured vertical stabilizer having a predetermined thickness and contiguous with the shroud, and a horizontal stabilizer intersecting the vertical stabilizer, an aft shroud closure, comprising:

planar member means for fixing the separation points of the mass airflow over the aft portions of the shroud, said planar member means having an angled "V" configuration commencing at the trailing edge of the vertical stabilizer.

* * * * *